(12) United States Patent
Katsumata

(10) Patent No.: US 8,890,811 B2
(45) Date of Patent: Nov. 18, 2014

(54) PROJECTION CONTROLLING APPARATUS AND PROJECTION CONTROLLING METHOD

(75) Inventor: Tomoya Katsumata, Yokohama (JP)

(73) Assignee: Kyocera Corporation, Kyoto (JP)

( * ) Notice: Subject to any disclaimer, the term of this patent is extended or adjusted under 35 U.S.C. 154(b) by 133 days.

(21) Appl. No.: 13/574,365

(22) PCT Filed: Jan. 21, 2011

(86) PCT No.: PCT/JP2011/051133
§ 371 (c)(1),
(2), (4) Date: Jul. 20, 2012

(87) PCT Pub. No.: WO2011/090176
PCT Pub. Date: Jul. 28, 2011

(65) Prior Publication Data
US 2012/0299823 A1    Nov. 29, 2012

(30) Foreign Application Priority Data
Jan. 22, 2010   (JP) .................................. 2010-012623

(51) Int. Cl.
*G06F 3/03*    (2006.01)
*G06F 3/038*   (2013.01)
*G06F 3/042*   (2006.01)

(52) U.S. Cl.
CPC ............ *G06F 3/0386* (2013.01); *G06F 3/0304* (2013.01); *G06F 3/0425* (2013.01)
USPC .......................................... 345/158; 345/156

(58) Field of Classification Search
None
See application file for complete search history.

(56) References Cited

U.S. PATENT DOCUMENTS

| | | | |
|---|---|---|---|
| 2009/0021480 A1 | 1/2009 | Tagawa | |
| 2012/0007801 A1* | 1/2012 | Banning | ........................ 345/156 |

FOREIGN PATENT DOCUMENTS

| | | |
|---|---|---|
| JP | 6139117 A | 5/1994 |
| JP | 6342362 A | 12/1994 |
| JP | 2000113105 A | 4/2000 |
| JP | 2000242427 | 9/2000 |
| JP | 2000242643 A | 9/2000 |
| JP | 2003288246 A | 10/2003 |
| JP | 2008027080 | 2/2008 |
| WO | 2006085580 | 8/2006 |

OTHER PUBLICATIONS

International Search Report for PCT/JP2011/051133 mailed Mar. 1, 2011.
Office Action mailed Mar. 11, 2014, corresponds to Japanese patent application No. 2010-012623, for which an explanation of relevance is attached.

* cited by examiner

*Primary Examiner* — Adam R Giesy
(74) *Attorney, Agent, or Firm* — Lowe Hauptman & Ham, LLP

(57) ABSTRACT

According to an aspect, a projection controlling apparatus for causing a projector to project an image includes a detector, an extractor, and a projection unit. The detector detects a point directed to a first image projected by the projector. The extractor extracts a first object contained in the first image based on the point. The projection unit causes the projector to project a second image that is an image with a pointing index added to the first object in the first image.

21 Claims, 15 Drawing Sheets

FIG.8
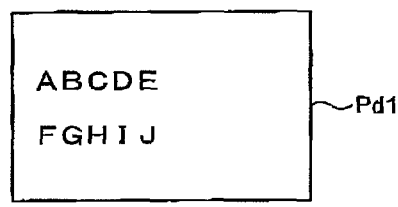
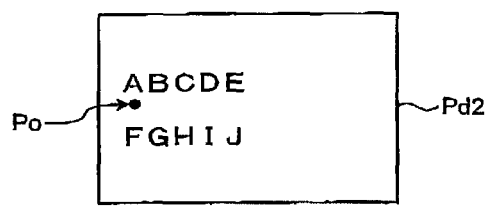
FIG.9
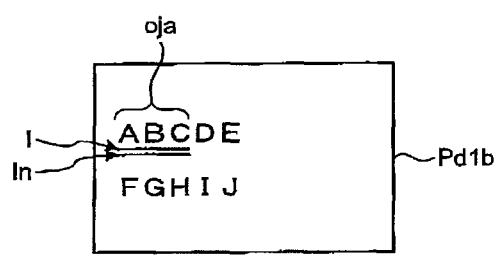

PROJECTION CONTROLLING APPARATUS AND PROJECTION CONTROLLING METHOD

CROSS-REFERENCE TO RELATED APPLICATION

This application is a National Stage of PCT international application Ser. No. PCT/JP2011/051133 filed on Jan. 21, 2011 which designates the United States, and which is based upon and claims the benefit of priority from Japanese Patent Application No. 2010-012623, filed on Jan. 22, 2010.

FIELD

The present disclosure relates to changing of an image to be projected by a projection apparatus when the image projected by the projection apparatus is pointed with, for example, a pointer.

BACKGROUND

So-called projectors have been used as an apparatus for projecting an image on a wall or a screen. When a presentation is made, for example, a lecturer sometimes points to an object, e.g., a character or a figure, that is present in an image being projected by a projector by using a tool such as a laser pointer. For example, Patent Literature 1 discloses a conference assisting method of receiving, when a video being projected on a screen is irradiated with light from a light-emitting pointer, reflection light of the light from the light-emitting pointer and detecting the track of the light from the light-emitting pointer, so as to perform display corresponding to the track of the light on the screen.

CITATION LIST

Patent Literature

Patent Literature 1: Japanese Patent Application Laid-Open No. 2000-242427

Technical Problem

Usually, light-emitting pointers such as laser pointers are held by a hand for manipulation; for this reason, projection shake may occur due to hand jiggling in projecting the track of the light-emitting pointer. According to the technology disclosed in Patent Literature 1, the track of the light emitted from a light-emitting pointer is entirely projected on the screen, display corresponding to an unwanted track of light caused by jiggling of hand or a pointing error may be also projected on the screen. As a result, an object to be emphasized may become hardly distinguishable. Display corresponding to the track of shaking light is projected on the screen, which may give uncomfortable feeling to the audience. Further, continuously projecting such a track of light may cause superimposition of a track line on the object or gradual increase of lines, thus causing the content of the projected image to be hardly discernable.

For the foregoing reasons, there is a need for suppressing, in attaching a pointing index such as an underline to an object pointed with a pointer from among objects that are contained in an image projected by a projector or the like, the pointing index or the object from becoming hardly discernable.

SUMMARY

According to an aspect, a projection controlling apparatus for causing a projector to project an image includes a detector, an extractor, and a projection unit. The detector detects a point directed to a first image projected by the projector. The extractor extracts a first object contained in the first image based on the point.

The projection unit causes the projector to project a second image that is an image with a pointing index added to the first object in the first image. According to another aspect, a projection controlling apparatus includes: a detector for comparing first image information with second image information to detect a point directed to a specific image based on the result of comparison; a specifier for specifying as a first object an object that is contained in the specific image and corresponds to the point detected by the detector; and a projection unit for causing an image to be projected. The first image information is for use in projection of the specific image. The second image information is obtained by capturing the specific image The image is projected based on the first image information with a pointing index for the specified first object being added thereto.

According to another aspect, the projection controlling apparatus includes a region generator for generating a first region associated with the first object specified. The projection unit is configured to cause the image to be projected in case where the point is detected within the first region continuously for a first period. The image is projected based on the first image information with the pointing index for the first object being added thereto.

According to another aspect, the projection controlling apparatus further includes: an output unit coupled to a projection apparatus for outputting the first image information as a projection image; and an input unit coupled to a imaging device for inputting a captured image as the second image information.

According to another aspect, the projection controller further includes: a projector for projecting an image; and a imaging unit for capturing the image projected by the projector. The projection unit is configured to cause the projector to project the specific image based on the first image information and to obtain the second image information by causing the imaging unit to capture the specific image.

According to another aspect, the region generator is configured to erase the first region in case where the point is not detected within the first region continuously for a second period between generating the first region and adding the pointing index to the first object.

According to another aspect, the projection unit is configured to decide at least one of the first period or the second period based on at least one of a dimension at a position of projection of the specific image projected by the projector based on the first image information, a proportion of the first object in the second image information, and a distance between a pointing person to give a point to the object and the position of projection of the specific image.

According to another aspect, the region generator is configured to decide a dimension of the first region based on at least one of a dimension at a position of projection of the specific image projected by the projector based on the first image information, or a proportion of the first object in the second image information, or a distance between a pointing person to give a point to the object and the position of projection of the specific image.

According to another aspect, the projection unit is configured to cause, in case where the object comprises at least one of a character and a numeric character, an image to be projected as the image with the pointing index for the first object being added thereto. The image is projected based on the first image information with the font of the character or the numeric character contained in the first object being changed.

According to another aspect, in projecting an image containing the first object with the pointing index added to the first image information and a second object adjacent to the first object, upon detection of movement of the point from the first region to a second region generated by the region generator as a region associated with the second object, the projection unit projects a resultant image of addition of a pointing index for the second object to the image being projected.

According to another aspect, the projection unit is configured to add a pointing index, to the second object, similar to the pointing index added to the first object.

According to another aspect, the region generator is configured to handle as the second object an object that is adjacent to the first object in a specific direction.

According to another aspect, the projection unit is configured to cause, upon detection of the point within the first region associated with the first object added with the pointing index continuously for a third period, the projector to project an image based on the first image information with a new pointing index being added to the first object added with the pointing index.

According to another aspect, the projection unit is configured to cause, upon detection of the point within the first region continuously for a fourth period, an image to be projected The image is an image based on the first image information with the pointing index added to the first object being deleted therefrom.

According to another aspect, the projection controller further includes a voice inputter for inputting voice. The projection unit is configured to cause, upon detection of a specific kind of voice from voice inputted from the voice inputter, an image to be projected. The image is an image with the pointing index for the first object being deleted.

According to another aspect, in case where the first image information includes a plurality of objects added with the pointing index, the projection controlling apparatus causes, upon detection of the specific kind of voice, an image to be projected. The image is based on the first image information with at least one of the pointing indices deleted therefrom.

According to another aspect, the projection controlling apparatus further includes a communicator for obtaining through a communication line the first image information for causing the projector to project a specific image. The projection unit is configured to cause the projector to project the specific image based on the first image information obtained from the communicator.

According to an aspect, a projection controlling method includes: causing a projector to project a first image; detecting a point directed to the first image projected by the projector; extracting a first object contained in the first image based on the point; and causing the projector to project a second image that is an image with a pointing index added to the first object in the first image. According to another aspect, a projection controlling method includes: causing a specific image to be projected based on first image information; causing the projected specific image to be captured; comparing the first image information with second image information resulting from the capturing of the specific image, to detect a point directed to the specific image based on the result of comparison; specifying as a first object an object that is contained in the specific image and corresponds to the point detected; and causing an image to be projected, the image having a pointing index for the specified first object added to the first image information.

According to another aspect, the projection controlling method includes: generating a first region that is a region associated with the specified first object; and in case where the point is continuously detected within the first region for a first period, causing an image to be projected, the image having the pointing index for the first object added to the first image information.

Advantageous Effects of Invention

The present invention allows for suppression of, in attaching a pointing index such as an underline to an object pointed with a pointer from among objects that are contained in an image projected by a projection unit of a projector or the like, the pointing index or the object from becoming hardly discernable.

BRIEF DESCRIPTION OF DRAWINGS

FIG. 8 is an explanatory diagram of a technique of detecting a point of a pointer.

FIG. 9 illustrates an example in which a pointing index is newly added.

DESCRIPTION OF EMBODIMENTS

The present invention is described below with reference to the drawings. It should be noted that the present invention is not limited by the following description. The components in the following description may include ones easily conceivable by those skilled in the art, ones substantially identical, and ones encompassed within a so-called equivalent scope. The components disclosed below may be combined as required.

Figure 1:
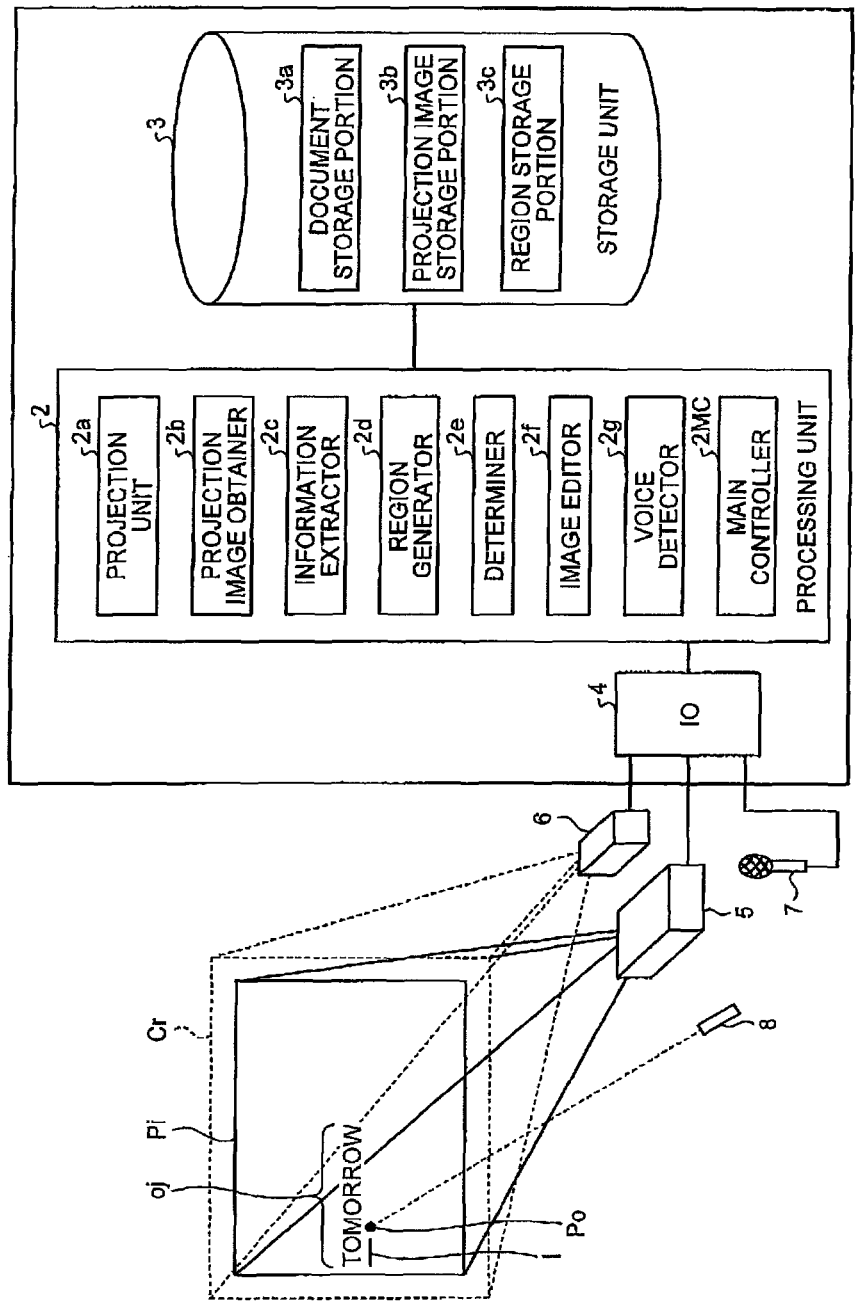
FIG. 1 is a schematic diagram illustrating a projection controlling apparatus according to an embodiment and a state in which the projection controlling apparatus is used to have a projection unit project an image.

FIG. 1 is a schematic diagram of a projection controlling apparatus according to an embodiment and a state in which the projection controlling apparatus is used to have a projection unit project an image. A projection controlling apparatus 1 illustrated in FIG. 1 performs control for causing a projector 5 serving as a projection unit to project a specific image. The image being projected by the projector 5 is referred to as a projection image Pi. When it is detected that a specific object oj in the projection image Pi is pointed with a pointer 8 serving as an object pointer, the projection controlling apparatus 1 performs control for projecting the image having the object oj emphasized by addition of a pointing index I, such as an underline, to the object oj. The object oj may be a character, a numeric character, a figure, a character string, and/or a pattern arranged in an image.

The projection controlling apparatus 1 includes a processing unit 2, a storage unit 3, and an input/output unit (IO) 4 that serve as a projection controller. The processing unit 2 has a function of performing integrated control over the overall operation of the projection controlling apparatus 1. More specifically, the processing unit 2 performs control over the operation of the projector 5 and a camera 6 that serves as an imaging unit, such that various processes of the projection controlling apparatus 1 are executed according to an appropriate procedure based on software stored in the storage unit 3. The various processes of the projection controlling apparatus 1 include, for example, a process of causing the projector 5 to project a specific image, a process of causing the camera 6 serving as the imaging unit to capture the image projected by the projector 5, and a process of performing a projection controlling method according to the embodiment.

The processing unit 2 reads successively command codes from a program, such as an operating system program or an application program, that is stored in the storage unit 3 to execute the processes. The processing unit 2 is, for example, an MPU (micro processing unit) and executes the above-described various processes of the projection controlling apparatus 1 according to the procedure instructed in the software.

The processing unit 2 has a function of executing a plurality of application programs. The plurality of application programs to be executed by the processing unit 2 includes, for example, an application for controlling drive of the projector 5 and the camera 6, an application program for reading various image data (image information) from the storage unit 3 for decoding, and an application program for causing the projector 5 to project images resulting from decoding.

In the present embodiment, the processing unit 2 includes a projection unit 2a, a projection image obtainer 2b, an information extractor (detector) 2c, a region generator 2d, a determiner (specifier) 2e, an image editor 2f, a voice detector 2g, and a main controller 2MC. The respective functions of the projection unit 2a, the projection image obtainer 2b, the information extractor 2c, the region generator 2d, the determiner 2e, the image editor 2f, and the voice detector 2g are implemented by hardware resources including the processing unit 2 and the storage unit 3 executing tasks to be assigned by the main controller 2MC of the processing unit 2. The tasks indicate the overall processing performed based on the application software or processing units that simultaneous execution is not possible of the processes performed based on the same application software.

The projection unit 2a causes the projector 5 to project image information stored in a projection image storage portion 3b. The information extractor 2c compares image information (first image information) with image information (second image information), where the first image information is the source of the projection image Pi that is currently being projected by the projector 5, and the second image information is obtainable by the camera 6 capturing the projection image Pi that is being projected by the projector 5 based on the first image information, so as to extract the position of a point Po given by the pointer 8. The information extractor 2c extracts the object oj indicated by the point Po based on the extracted point Po. The region generator 2d sets a region in which shake of the point Po is tolerated. The determiner 2e determines whether or not the point Po is within the region. The image editor 2f generates, in the case where the point Po exists for a certain period of time within the region generated by the region generator 2d, image information with a pointing index I attached to a specific object oj existing within the region, so as to have the generated image information stored in the projection image storage portion 3b. The voice detector 2g serves as a voice inputter that is adapted to detect a specific kind of voice from the voice obtained by a microphone 7 configuring the voice inputter. The main controller 2MC assigns tasks to hardware resources including the processing unit 2 and the storage unit 3 of the projection controlling apparatus 1 to cause the hardware resources to execute the processes described in the tasks.

The storage unit 3 stores software and data to be used for the processing at the processing unit 2. The storage unit 3 also stores tasks to activate the above-described application program for controlling drive of the projector 5 and the camera 6 and tasks to activate a computer program for projection control according to the present embodiment. In addition to these tasks, the storage unit 3 stores, for example, software to be used by the processing unit 2 for the control over the storage unit 3 and temporary data to be used in the processes of the software processing. The storage unit 3 is, for example, a nonvolatile storage device such as nonvolatile semiconductor memory, e.g., ROM (Read Only Memory), and a hard disk device, or a readable/writable storage device such as SRAM (Static Random Access Memory) and DRAM (Dynamic Random Access Memory).

The storage unit 3 has a document storage portion 3a, the projection image storage portion 3b, and a region storage portion 3c. The document storage portion 3a stores image information that the projection controlling apparatus 1 causes the projector 5 to project. The projection image storage portion 3b stores, in the initial state, the image information that the projection controlling apparatus 1 causes the projector 5 to project, and in the case of performing the projection controlling method according to the embodiment, stores image information generated by the image editor 2f. The region storage portion 3c stores information, e.g., the coordinates, of the point shake-tolerated region generated by the region generator 2d.

The input/output unit 4 serving as an output unit and an input unit is provided between instruments to be connected to the projection controlling apparatus 1 and the processing unit 2, so as to be used for exchange of information therebetween. In the present embodiment, the instruments to be connected to the input/output unit 4 include the projector 5, the camera 6, and the microphone 7. The projector 5 projects, under the control of the projection controlling apparatus 1, images based on the first image information that is stored in the projection image storage portion 3b of the projection controlling apparatus 1. The projector 5 may be of a scanning type that uses, for example, laser serving as a light source but is not limited thereto. The camera 6 may use, for example, a imaging device such as a CCD (Charge Coupled Device) image sensor and is configured to capture the projection image Pi produced by the projector 5. As illustrated in FIG. 1, the camera 6 has an imaging region Cr set so as to fully cover the projection image Pi produced by the projector 5. The microphone 7 obtains voice spoken by a person handling the pointer 8, such as a pointing person or a lecturer.

Figure 2:
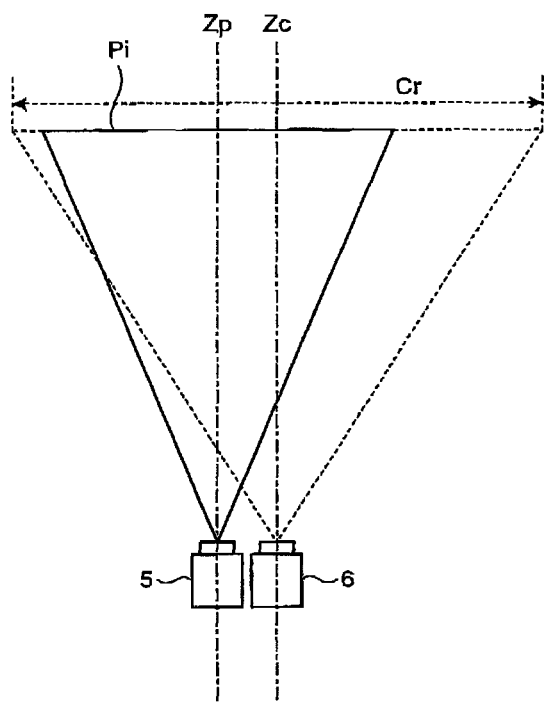
FIG. 2 is a schematic diagram illustrating a relationship between the optical axis of the projection unit and the optical axis of an imaging unit.

FIG. 2 is a schematic diagram illustrating a relationship between the optical axis of the projection unit and the optical axis of the imaging unit. The optical axis Zp of the projector 5 serving as the projection unit may be parallel to the optical axis Zc of the camera 6 serving as the imaging unit. In this manner, the projection image Pi of the projector 5 is entirely included within the imaging region Cr of the camera 6, such that distortion in the projection image Pi captured by the camera 6 is suppressed to a minimum extent. In the case where the optical axis Zp of the projector 5 is not parallel to the optical axis Zc of the camera 6, the projection image Pi captured by the camera 6 distorts in a trapezoidal shape. In this case, depending on the angle of inclination between the optical axis Zp and the optical axis Zc, the projection controlling apparatus 1 may correct the trapezoidal shape of the projection image Pi captured by camera 6. Setting the optical axis Zp and the optical axis Zc in parallel to each other does not entail the correction of the trapezoidal shape and thus reduces the processing load of the projection controlling apparatus 1, which is desirable.

In the projection controlling apparatus 1, the projector 5, the camera 6, and the microphone 7 may be discrete units. The projector 5, the camera 6, and the microphone 7 may be connected with a personal computer, and the personal computer may implement the functions of the projection controlling apparatus 1. In this case, the personal computer configures the projection controlling apparatus 1. In such a mode, for example, a sound collector, e.g., a microphone, and/or an imaging unit, e.g., a mobile camera, that are (is) built in the personal computer may be used as the microphone 7 and/or the camera 6.

Figure 3:
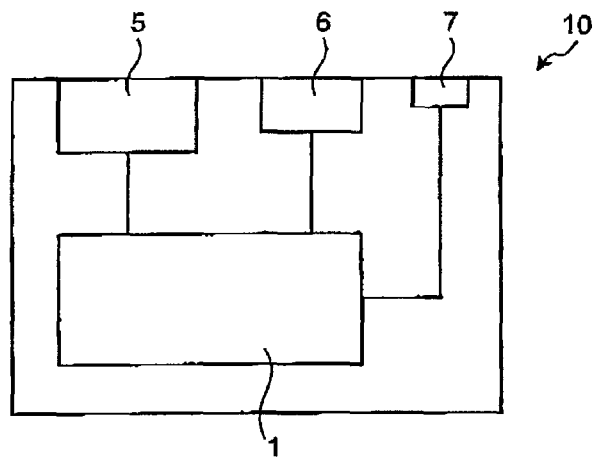
FIG. 3 is a diagram illustrating a configuration of a projection apparatus according to the embodiment.
Figure 4:
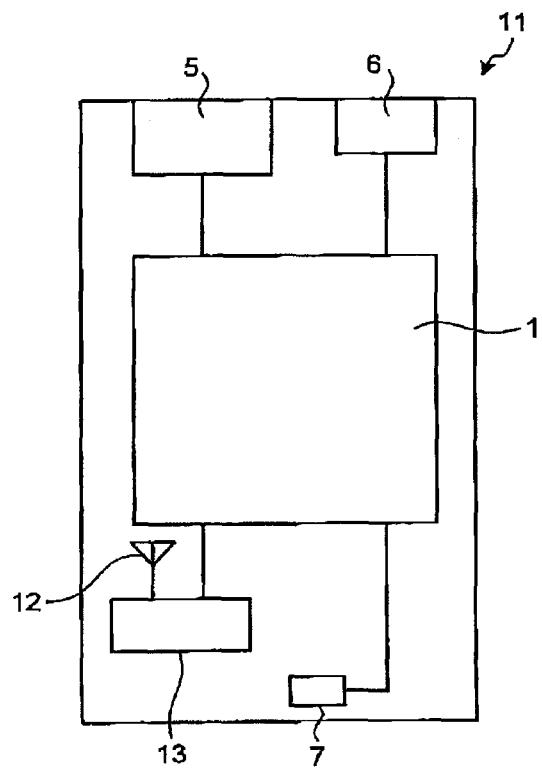
FIG. 4 is a diagram illustrating a configuration of a mobile device according to the embodiment.

FIG. 3 is a diagram illustrating a configuration of a projection apparatus according to the present embodiment. FIG. 4 is a diagram illustrating a configuration of a mobile device according to the present embodiment. The projection apparatus 10 illustrated in FIG. 3 has the projector 5, the camera 6, the microphone 7, and the above-described projection controlling apparatus 1 contained in one housing. The mobile device 11 illustrated in FIG. 4 has the above-described projection controlling apparatus 1, the projector 5, the camera 6, the microphone 7, and a communication unit having a communication unit 13 to be connected to an antenna 12 and the projection controlling apparatus 1 contained in one housing. Thus, the mobile device 11 has a radio communication function. The mobile device 11 is, for example, a mobile phone. In the mobile device 11, the antenna 12 and the communication unit 13 establish a wireless signal path with a base station according to a system such as CDMA (Code Division Multiple Access) system to perform telephone communication and information communication with the base station through a channel allocated by the base station. The mobile device 11 is not limited to mobile phones and may be, for example, PHSs (Personal Handyphone Systems), PDAs, and gaming devices. Next, description is given of a projection controlling method according to the present embodiment. The projection controlling method according to the present embodiment is implemented by the above-described projection controlling apparatus 1 executing a projection controlling computer program according to the present embodiment.

Figure 5:
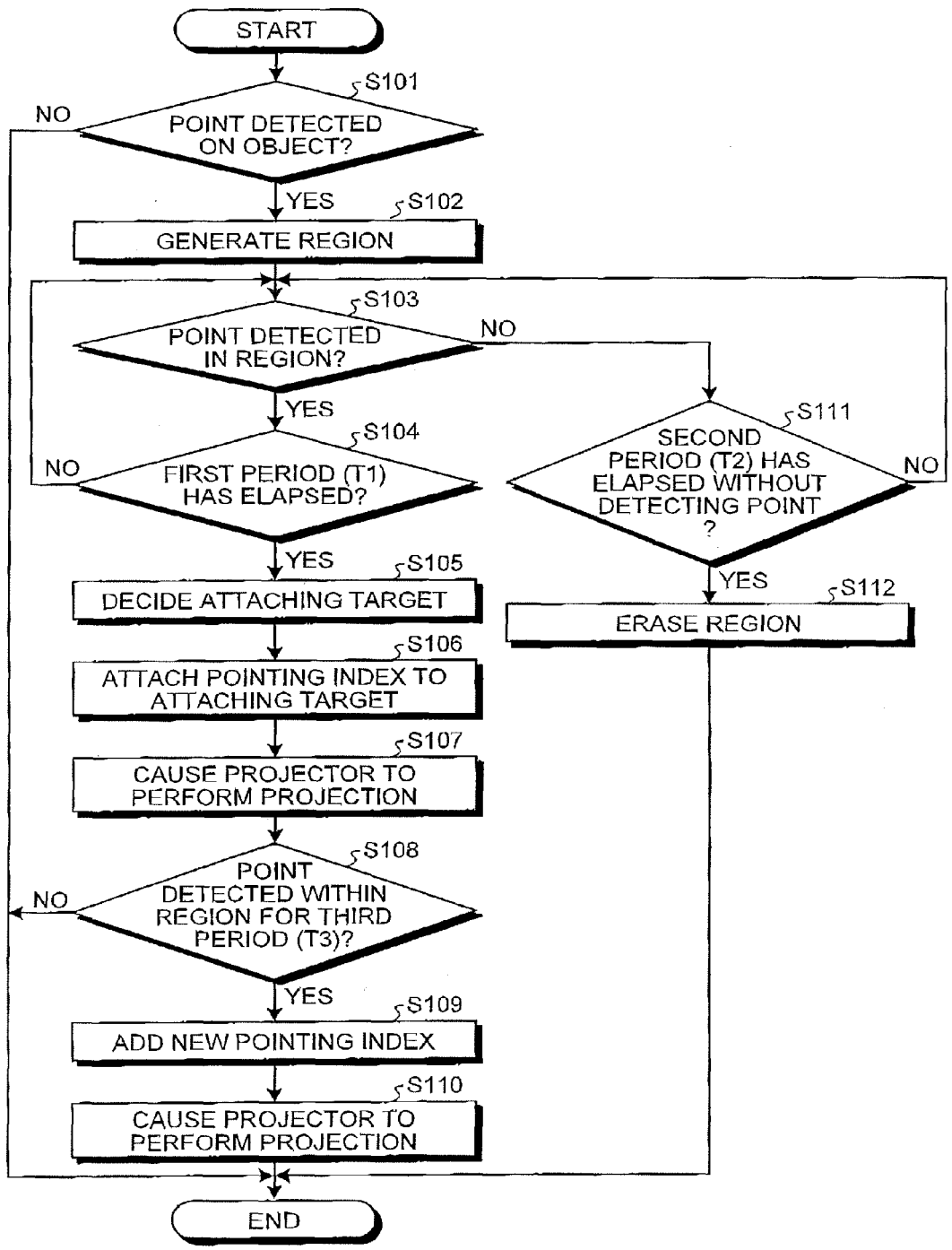
FIG. 5 is a flowchart illustrating the steps of a projection controlling method according to the embodiment.
Figure 6:
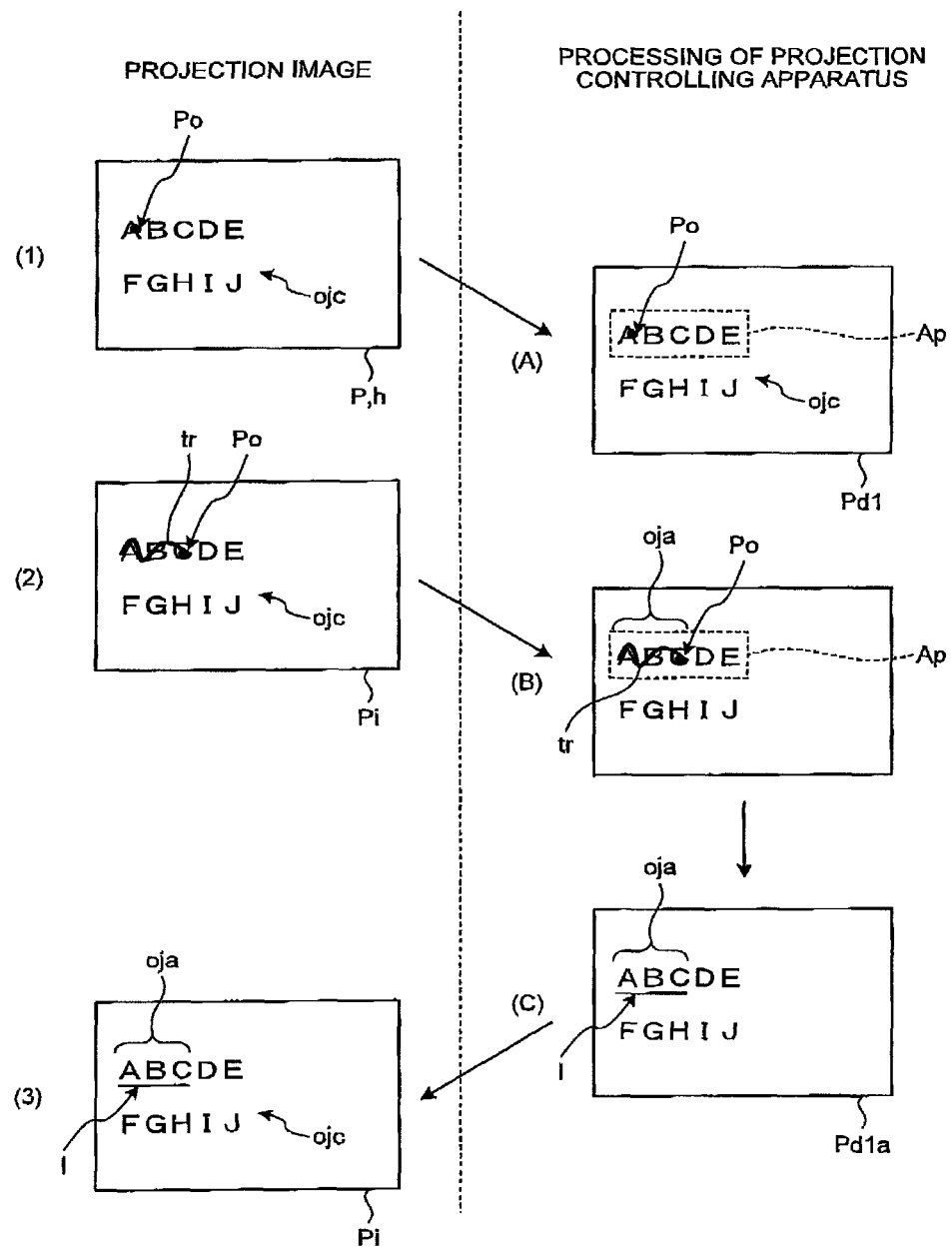
FIG. 6 is an explanatory diagram of the projection controlling method according to the embodiment.
Figure 7:
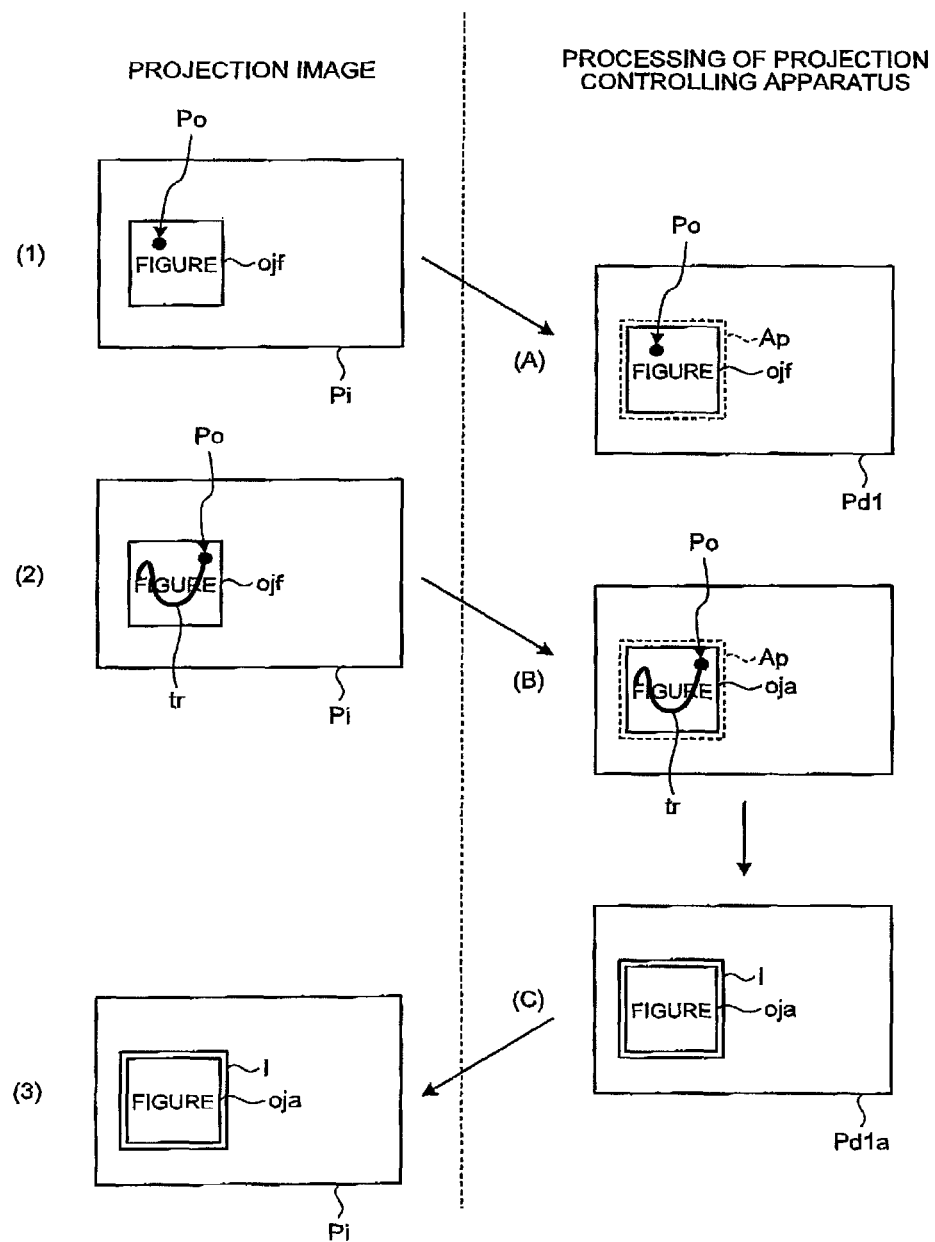
FIG. 7 is an explanatory diagram of the projection controlling method according to the embodiment.

FIG. 5 is a flowchart illustrating the steps of the projection controlling method according to the present embodiment. FIGS. 6 and 7 are explanatory diagrams of the projection controlling method according to the present embodiment. FIG. 6 illustrates a case in which the target to be attached with a pointing index has at least either a character or a numeric character, and FIG. 7 illustrates a case in which the target to be attached with a pointing index is a figure. FIG. 8 is an explanatory diagram of a technique of detecting the point of a pointer. In the description below, a "character string" indicates the target to be attached with a pointing index having at least either a character or a numeric character.

To perform the projection control according to the present embodiment by the projection controlling apparatus 1 illustrated in FIG. 1, the projector 5 shall be projecting an image. More specifically, the projection unit 2a of the projection controlling apparatus 1 illustrated in FIG. 1 obtains first image information from the projection image storage portion 3b of the storage unit 3 and causes the projector 5 to project the image information. The projection image storage portion 3b stores, in the initial state, image information that is the same as that stored in the document storage portion 3a as the first image information. Meanwhile, after a pointing index is attached to the first image information, the projection image storage portion 3b freshly stores the first image information with the pointing index attached thereto as first image information. In the mobile device 11 illustrated in FIG. 4, the projection controlling apparatus 1 obtains through the communication unit the first image information through a communication path, for storage in the projection image storage portion 3b.

At Step S101, the information extractor 2c of the projection controlling apparatus 1 determines based on the first image information whether or not detection is made of a point Po of the pointer 8, which point is directed and placed on an object in the projection image Pi being projected by the projector 5.

As illustrated in FIG. 8, the information extractor 2c compares first image information Pd1, which is source image information of the projection image Pi being projected by the projector 5, with second image information Pd2, which is obtainable by the camera 6 capturing the projection image Pi being projected by the projector 5, so as to determine whether or not the point Po of the pointer 8 is detected. The second image information Pd2 is obtained by the projection image obtainer 2b of the projection controlling apparatus 1 illustrated in FIG. 1 from the camera 6.

The information extractor 2c compares the first image information Pd1 with the second image information Pd2 and detects the point Po of the pointer 8 based on the difference between the first image information Pd1 and the second image information Pd2. More specifically, in the example illustrated in FIG. 8, once difference is found between the first image information Pd1 and the second image information Pd2, the remaining information that is different therebetween is the point Po of the pointer 8; thus, the point Po is detectable. In the present embodiment, while a laser pointer is used as the pointer 8, the pointer 8 is not limited thereto, and may be, for example, a pointer rod.

At Step S101, in the case where the information extractor 2c does not detect the point Po (No at Step S101), the projection control according to the present embodiment is terminated. At Step S101, in the case where the information extractor 2c detects the point Po (Yes at Step S101), the information extractor 2c extracts an object that is pointed by the point Po, and the processing proceeds to Step S102. In (1) illustrated in FIG. 6, the point Po is present at the position of "A" in a character string object ojc of the projection image Pi. In (1) illustrated in FIG. 7, the point Po is present at the position of a figure object ojf of the projection image Pi. The information extractor 2c compares the second image information Pd2 that is obtained by the camera 6 capturing such a projection image Pi with the first image information Pd1 that is the source of the projection image Pi to find difference therebetween, such that the point Po is detected. Then, the information extractor 2c extracts an object existing at the position of the point Po detected, i.e., "A" in the character string object ojc in (1) of FIG. 6, and the figure object ojf in (1) of FIG. 7. This is because the object that exists at the position of the point Po may be determined as the object being pointed with the point Po. The information of the object thus extracted, such as information relating to attributes of the object including the coordinates and the font type, is temporarily stored in a specific area in the storage unit 3.

At Step S102, the region generator 2d of the projection controlling apparatus 1 illustrated in FIG. 1 generates a region Ap, which is a first region associated with the extracted object, i.e., "A" in the character string object ojc in (A) of FIG. 6 and the figure object ojf in (A) of FIG. 7, in the first image information Pd1, as illustrated in (A) of FIGS. 6 and 7. The region Ap generated is stored by the region storage portion 3c of the storage unit 3.

The region Ap is a region that tolerates deviation of the point Po of the pointer 8 from an object to be pointed originally due to, for example, hand jiggling of the pointing person holding the pointer 8. The region Ap may be set in advance and stored in a specific area of the storage unit 3 or may be decided according to the dimensions of the object extracted based on the point Po. In the latter case, the region generator 2d generates the region Ap, for example, in a specific range around the extracted object, for example, for several pixels to several tens of pixels.

In the case where the extracted object constitutes a portion of a character string object ojc, the region generator 2d may generate the region Ap in a specific range around the extracted object and also in the direction of array of the character string, which is usually the direction from the right to the left, from the object. In the case where emphasis is placed by the pointer 8 on the character string object ojc, not only a single character contained in the character string object ojc but also a plurality of characters are often emphasized in the direction of array of the character string with the point Po being moved. Generating the region Ap in a specific range in the direction of array of the character string, as illustrated in (A) of FIG. 6, allows for inclusion of the character string object ojc containing the extracted object into the region Ap. The region generator 2 is thus configured to generate the region Ap in a portion that is expected to have the point Po of the pointer 8 about to be moved thereto, thus ensuring reliable detection of the movement of the point Po of the pointer 8 and reliable attachment of a pointing index to the character string to be put emphasis on.

In the present embodiment, the region Ap generated by the region generator 2d is usually an invisible region that is not to be projected by the projector 5. The region Ap however may be made visible, so as to be projected by the projector 5. In this manner, the pointing person may set a target within the region Ap and direct the point Po with the pointer 8 thereto, for the region Ap is explicitly displayed around the object that is intended to be emphasized. As a result, the region Ap serves as a guide for the point Po of the pointer 8, and pointing error by the pointing person is hence suppressible.

Upon generation of the region Ap, the processing unit 2 causes the processing to proceed to Step S103. At Step S103, the determiner 2e of the projection controlling apparatus 1 illustrated in FIG. 1 determines whether or not a point Po is detected within the region Ap generated by the region generator 2d. The processing unit 2 causes the processing to proceed to Step S104 when the determiner 2e determines that a point Po is detected within the region Ap. At Step S104, the determiner 2e determines whether or not a predefined first period (T1) has elapsed while the point Po remains detected within the region Ap passes. In the case where the period has not elapsed (No at Step S104), the determiner 2e repeats Steps S103 and S104 until the first period (T1) has passed. In the case where the first period (T1) has elapsed while the point Po remains detected within the region Ap (Yes at Step S104), the processing proceeds to Step S105. In this manner, through Steps S103 and S104, the determiner 2e determines whether or not the point Po has been continuously detected within the region Ap for the first period (T1).

For example, in (2) of FIG. 6, the point Po of the pointer 8 is moved along a portion of "ABC" of the character string object ojc in the direction of array of the character string as emphasis is to be placed on this portion; however, the track tr of the point Po is distorted due to the effect of hand jiggling. Likewise, in (2) of FIG. 7, the point Po of the pointer 8 is moved in an enclosing manner about the figure object ojf as this portion is intended to be put emphasis on; however, the track tr of the point Po is distorted due to the effect of hand jiggling. On the other hand, as illustrated in (B) of FIG. 6 and (B) of FIG. 7, since the region generator 2d of the projection controlling apparatus 1 generates the region Ap so as to correspond to the object pointed by the point Po detected at Step S101, the track tr stays within the region Ap even if the point Po is greatly shaken while being moved. At steps S103 and S104, the determiner 2e determines whether or not the point Po has been continuously detected within the region Ap for the first period (T1), in which manner confirmation is made that the pointing person has an intention to indicate an object with emphasis added thereon with the point Po by using the pointer 8.

In the case where Yes is determined at Step S104, the intention of the pointing person to indicate an object to be emphasized is confirmed based on the point Po of the pointer 8, and the processing thus proceeds to Step S105. At Step S105, the determiner 2e decides a target to be attached with a pointing index (an attaching target). For example, in (B) of FIG. 6, "ABC" in the region Ap is set as an attaching target oja. The attaching target oja is decided, for example, based on the range of movement of the point Po. More specifically, the determiner 2e sets an object existing in the range of movement of the point Po as the attaching target oja. For example, in (B) of FIG. 7, a figure object in the region Ap is set as the attaching target oja. In this case, for example, the determiner 2e sets a figure object that overlaps with the track tr of the point Po as the attaching target oja.

Subsequently, the processing proceeds to Step S106, and as illustrated in (C) of FIG. 6 and (C) of FIG. 7, the image editor 2f of the projection controlling apparatus 1 illustrated in FIG. 1 generates image information (first image information) Pd1a with a pointing index I attached to the attaching target oja. For example, as illustrated in (C) of FIG. 6, in the case where the attaching target oja is a portion of a character string object, the image editor 2f generates an image in which the font of a character or a numeric character contained in the attaching target oja is changed, as the first image information Pd1a that is to be a source of the image to be projected by the projector 5; and then the projection unit 2a causes the projector 5 to project the image information as an image with the pointing index I added thereto. In the example of (C) of FIG. 6, an underline is attached as the pointing index I to the attaching target oja by changing the font to underlined one. The pointing index I is not limited to underlines but may be implemented, for example, such that the attaching target oja is displayed in bold characters, is changed in form of character, is given a color. Thus, a pointing index is attachable to the attaching target oja in a simple manner by means of change of fonts.

As illustrated in (C) in FIG. 7, in the case where the attaching target oja is a figure object, the image editor 2f generates an image having the attaching target oja enclosed with a line as the first image information Pd1a to be a source of the image to be projected by the projector 5, such that the projection unit 2a causes the projector 5 to project the image information as an image added with the pointing index I. In the example of (C) of FIG. 7, a line enclosing the attaching target oja is attached to the attaching target oja as the pointing index I. The pointing index I is not limited to the enclosing line but may be, for example, implemented by coloring the attaching target oja.

At Step S106, when the image editor 2f generates the first image information Pd1a with the pointing index I attached to the attaching target oja, the image editor 2f causes the projection image storage portion 3b of the storage unit 3 to store the first image information Pd1a. Then, the processing proceeds to Step S107, wherein the projection unit 2a obtains the first image information Pd1a from the projection image storage portion 3b and causes the projector 5 to project an image based thereon. As illustrated in (3) of FIG. 6, the projection image Pi of the projector 5 based on the first image information Pd1a is such that an underline serving as the pointing index I is affixed to the attaching target oja, i.e., "ABC" in (3) of FIG. 6, of the character string object ojc. As illustrated in (3) of FIG. 7, in the case where a figure object is the attaching target oja, the projection image Pi of the projector 5 based on the first image information Pd1a is such that the attaching target oja is enclosed with a line.

FIG. 9 illustrates an example in which a pointing index is newly added. When the projector 5 projects an image based on the first image information Pd1a, the processing proceeds to Step S108. At Step S108, the determiner 2e determines whether or not the point Po has been continuously detected within the region Ap for a predefined certain third period (T3). The pointing index I has already been given to the object within the region Ap at Step S105. T3 may be, for example, set longer than T1. In the case where the determiner 2e does not continuously detect the point Po within the region Ap for the third period (T3) (No at Step S108), the projection controlling method according to the present embodiment is terminated.

In the case where the determiner 2e continuously detects the point Po within the region Ap for the third period (T3) (Yes at Step S108), the processing proceeds to Step S109. At Step S109, as illustrated in FIG. 9, the image editor 2f obtains the first image information Pd1a attached with the pointing index I from the projection image storage portion 3b, generates first image information Pd1b in which a pointing index In is newly added thereto, and causes the projection image storage portion 3b to store the information. Then, the processing proceeds to Step S110, and the projection unit 2a obtains the first image information Pd1b from the projection image storage portion 3b and causes the projector 5 to project an image based thereon.

In the example illustrated in FIG. 9, the new pointing index In is an underline to be added to the underline serving as the pointing index I that has been attached to the attaching target oja. The new pointing index In is not limited thereto and may be, for example, implemented such that the underline serving as the pointing index I is thickened, or that the color of the underline is changed, or that the color of the attaching target oja is changed. The new pointing index In is, like the pointing index I, attached to the attaching target oja in such a manner that the image editor 2f generates as the first image information Pd1b an image in which the font of the attaching target oja is changed. Thus, placing the point Po within the region Ap for a specific period facilitates the operation to further emphasize an object added with the pointing index I for projection by the projector 5. The operation of attaching the new pointing index In is not limited thereto and may be, for example, implemented such that an image with a press button for addition of a pointing index is projected by the projector 5 so as to allow the point Po to be placed thereon, or that the point Po is reciprocated several times on an object attached with the pointing index I. Next, description is given back from Step S103.

When the determiner 2e determines that the point Po is not detected within the region Ap at Step S103, the processing proceeds to Step S111. At step S111, the determiner 2e determines whether or not a predefined certain second period (T2) has elapsed with the point Po not detected within the region Ap. This is a state prior to addition of a pointing index to an object in the projection image Pi of the projector 5. In the case where the length of period in which the point Po is not detected within the region Ap is equal to or less than the second period (T2) (No at Step S111), the processing returns to Step S103 and the determiner 2e determines whether or not the point Po is detected within the region Ap. T2 may be, for example, set shorter than T1.

The determiner 2e determines whether or not the second period (T2) has been detected with the point Po not detected within the region Ap at Steps S103 and S111, which enables determination as to whether or not the movement of the point Po is a shake caused by hand jiggling. More specifically, in the case where the point Po has not been out of the region Ap for the second period (T2) after the detection of the point Po within the region Ap at Step S103 (No at Step S111), it may be so determined that, while the pointing person has an intention to indicate an object to be emphasized with the point Po by using the pointer 8, the point Po went out of the region Ap inevitably by the pointing person's hand jiggling. On the other hand, in the case where the point Po has been out of the region Ap for the second period (T2), it may be so determined that the pointing person has an intention to turn the point Po of the pointer 8 away from the object indicated originally.

Hence, in the present embodiment, in the case where the determiner 2e determines that the point Po has been out of the region Ap for the second period (T2) (Yes at Step S111), the processing proceeds to Step S112, and the region generator 2d erases the region Ap. More specifically, the region generator 2d erases the region Ap stored in the region storage portion 3c. In this manner, preparation is made for the pointing person's operation to point with the pointer 8 a new object to be put emphasis on. In the case where change is made on the first image information serving as the source of the projection image being projected by the projector 5, the region Ap is erased from the region storage portion 3c, and the first image information with the pointing index I is deleted from the projection image storage portion 3b.

If the track of the point Po of the pointer 8 is given to an object as it is as a pointing index, the pointing index I exhibits the effect of shake due to hand jiggling, such that the pointing index I is superimposed on the object or the pointing index I itself is superimposed on the pointing index, leading to difficulty in discerning the object. According to the present embodiment, however, an object pointed with the point Po within the region Ap is extracted and the pointing index I is attached at a fixed position of the extracted object, e.g., at a portion below a character and in the vicinity of a figure; hence, as compared with the case where the track of the point Po of the pointer 8 is given to an object as it is as a pointing index, a pointing index is appropriately attachable to an object intended by the pointing person. In this manner, it becomes possible to prevent the effect of shake of the point Po due to hand jiggling from being reflected on the pointing index I, and thus situations inviting difficulty in discerning an object or a pointing index I are obviated where a pointing index I is superimposed on an object, or a pointing index I is given to an object that is not intended by the pointing person, or a pointing index I itself is superimposed on the pointing index I. Further, it hardly happens that the audience will feel an uncomfortable feeling. Moreover, since difficulty in discerning the object or the pointing index I is obviated, which allows for clarification of the object on which the pointing person wants to place emphasis.

Furthermore, according to the technology described in the above-described Patent Literature 1, an image having a display corresponding to the track of light reflected thereon has to be updated point by point in the case where the light spot of the light-emitting pointer is moved, and thus the technology entails a large size of storage area for storing the image information. Meanwhile, according to the present embodiment, the pointing index I is attached to an object in the case where a point Po is detected within the region Ap created around the object. Thus, even when the point Po is moved, the pointing index I is basically not changed, and the image does not have to be updated point by point upon movement of the point Po. Hence, the present embodiment entails a smaller storage area for storing the image information.

Moreover, according to the present embodiment, even when the point Po goes out of the region Ap due to hand jiggling, shake by hand jiggling is determined if it happens within the second period (T2), so as to retain the region Ap. In this manner, according to the present embodiment, specification of an object to which the pointing person intends to attach a pointing index I is kept even when the point Po temporarily goes off of the object to be attached with the pointing index I due to hand jiggling. Especially, with the mobile device 11 as illustrated in FIG. 4, a case may occur in which operation on operating buttons of the mobile device 11 causes the image to be projected itself is moved. In the case where the mobile device 11 is held by one hand to project an image while the pointer 8 is manipulated by the other hand, the effect of hand jiggling is pronounced. According to the present embodiment, specification of an object to which the pointing person intends to attach a pointing index I is maintained even in such a case, which is especially desirable for the mobile device 11 including the projector 5.

In the projection controlling method according to the present embodiment, the first period (T1) at Step S104 and the second period (T2) at Step S111 may be changed based at least one of the dimensions at the position of projection of the projection image Pi projected by the projector 5 based on the first image information Pd1, the proportion of the object extracted by the information extractor 2c in the second image information, and the distance between the pointing person and the position of projection. Next, description is given of a technique of changing the first period (T1) and the second period (T2).

Figure 10:
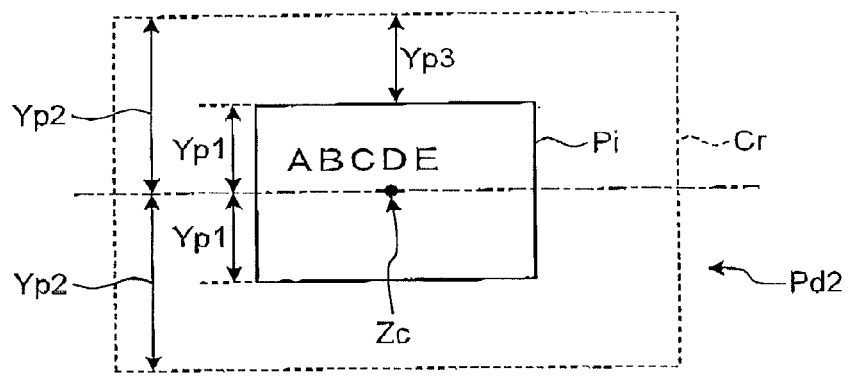
FIG. 10 is a diagram for explaining an example in which a first period (T1) and a second period (T2) are changed based on the dimensions at the position of projection of a projection image that is projected by a projector.
Figure 11:
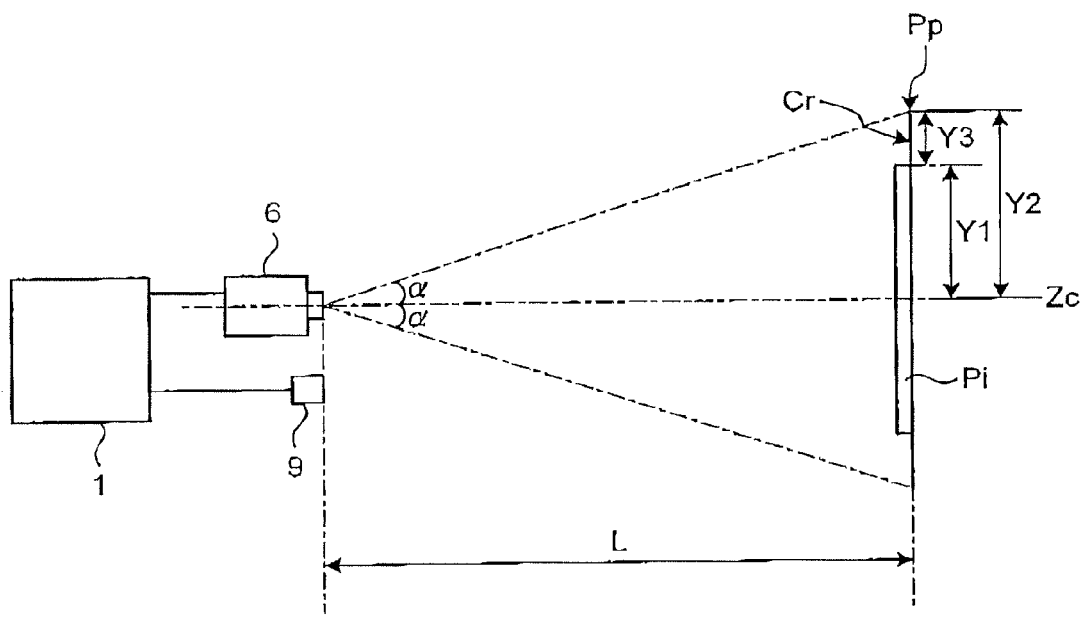
FIG. 11 is a diagram for explaining an example in which the first period (T1) and the second period (T2) are changed based on the dimensions at the position of projection of the projection image that is projected by the projector.

FIGS. 10 and 11 are diagrams for describing an example in which the first period (T1) and the second period (T2) are changed based on the dimensions at the position of projection of a projection image projected by the projector. With reduction in dimension at the position of projection of the projection image Pi projected by the projector illustrated in FIG. 1, the point Po is more likely to go out of the region Ap illustrated in FIGS. 6 and 7 due to the effect of hand jiggling. For this reason, the second period (T2) may be extended and the first period (T1) may be shortened with reduction in dimension of the projection image Pi at the position of projection. In this manner, the effect of hand jiggling is reliably eliminated, and a situation is avoided where a pointing index is unable to be given to an object because of the dimensions of the projection image or the dimensions of the object to be given the pointing index.

As illustrated in FIG. 10, the second image information Pd2 is depicted, which information is generated by the image editor 2f of the projection controlling apparatus 1 illustrated in FIG. 1 based on an image captured by the camera 6. The dimensions (the perpendicular dimensions) 2×Yp1 at the position of projection of the projection image Pi projected by the projector 5 are given by the equation (1) as the projection image Pi is inside the imaging region Cr of the camera 6. Zc in FIG. 10 indicates the optical axis of the camera 6, Yp1 indicates the distance from the optical axis Zc to a side of the projection image Pi, Yp2 indicates the distance from the optical axis Zc to a side of the imaging region Cr, and Yp3 indicates the distance between the side of the imaging region Cr and the side of the projection image Pi. Yp1, Yp2, and Yp3 are represented by pixel numbers, and each one pixel has the same dimensions in the second image information Pd2.

$$2 \times Yp1 = 2 \times (Yp2 - Yp3) \tag{1}$$

According to FIG. 11, the imaging angle 2×α of the camera 6 may be used to represent the relationship between the distance L from the camera 6 to the position of projection Pp and the distance Y2 from the optical axis Zc to a side of the imaging region Cr at the position of projection Pp of the projection image Pi by the equation (2). The distance L is found by a distance sensor 9.

$$Y2 = L \times \tan \alpha \qquad (2)$$

Assuming the dimensions of one pixel of the second image information Pd2 are a, Y2/Yp2 is equal to the dimensions of one pixel of the second image information Pd2 at the position of projection Pp of the projection image Pi. Hence, the dimensions 2×Y1 of the projection image Pi at the position of projection Pp is obtainable according to the equation (3).

$$2 \times Y1 = 2 \times Yp1 \times Y2/Yp2 = 2 \times (Y2 - Y2 \times Yp3/Yp2) = 2 \times L \times (1 - Yp3/Yp2) \times \tan \alpha \qquad (3)$$

For example, in performing the projection control according to the present embodiment, the main controller 2MC of the projection controlling apparatus 1 illustrated in FIG. 1 executes tasks to calculate the dimensions of the projection image Pi at the position of projection Pp. Then, the main controller 2MC executes tasks to change the first period (T1) and the second period (T2) to change the first period (T1) and the second period (T2) based on the resultant dimensions of the projection image Pi at the position of projection Pp.

Figure 12:
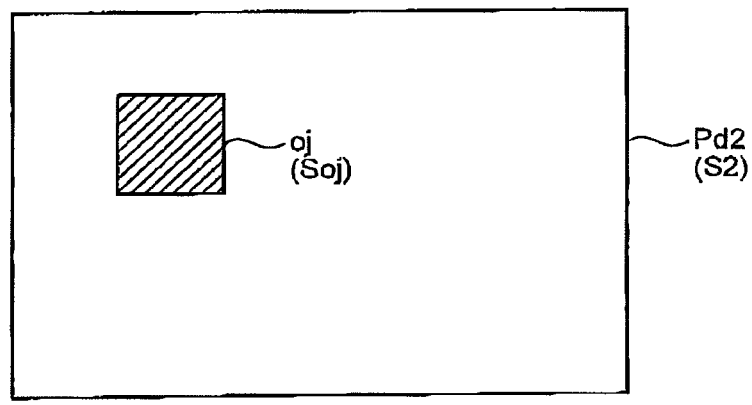
FIG. 12 is a diagram for explaining an example in which a first period (T1) and a second period (T2) are changed based on a proportion in second image information of an object extracted by an information extractor.

FIG. 12 is a diagram for explaining an example in which the first period (T1) and the second period (T2) are changed based on the proportion of an object extracted by the information extractor in second image information. FIG. 12 illustrates the proportion of the object oj extracted by the information extractor 2c illustrated in FIG. 1 in the second image information Pd2. It can be said that the proportion of the object oj (hereinafter referred to as an object ratio) in the second image information Pd2 decreases as reduction in dimension of the object oj in the projection image Pi at the position of projection. With the reduction in dimension of the object oj in the projection image Pi at the position of projection, the point Po is more likely to go out of the region Ap illustrated in FIGS. 6 and 7 due to the effect of hand jiggling. Hence, the second period (T2) may be extended and the first period (T1) may be shortened with the decrease of the object ratio. In this manner, effect of hand jiggling is more reliably eliminated. As a result, a situation is avoidable where a pointing index is unable to be given to an object because of, for example, the dimensions of the projection image.

The object ratio is, for example, the proportion of the area (or pixel numbers) Soj of the object oj in the entire area (or the entire pixel numbers) S2 of the second image information Pd2 and is represented by Soj/S2. For example, in performing projection control according to the present embodiment, the main controller 2MC of the projection controlling apparatus 1 illustrated in FIG. 1 executes tasks to calculate the object ratio. Then, the main controller 2MC executes tasks to change the first period (T1) and the second period (T2), so as to change the first period (T1) and the second period (T2) based on the resultant object ratio.

Figure 13:
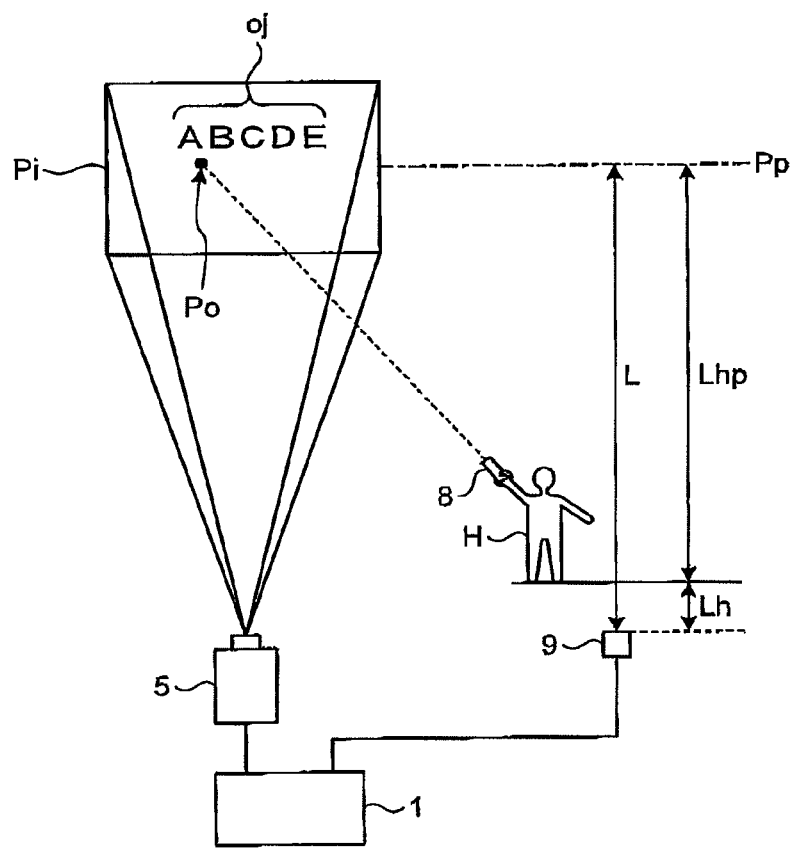
FIG. 13 is a diagram for explaining an example in which a first period (T1) and a second period (T2) are changed based on the distance between a pointing person and a position of projection.

FIG. 13 is a diagram for explaining an example in which the first period (T1) and the second period (T2) are changed based on the distance between the pointing person and the position of projection. A tendency is seen such that the point Po for the object oj is more likely to go out of the region Ap illustrated in FIGS. 6 and 7 due to the effect of hand jiggling with increase in distance Lhp between the pointing person H and the projection image Pi projected by the projector 5 illustrated in FIG. 13. For this reason, the second period (T2) may be extended and the first period (T1) may be shortened with increase of the distance Lhp between the pointing person H and the position of projection. In this manner, effect of hand jiggling is reliably eliminated, and a situation is thus avoidable where a pointing index is unable to be given to an object because of, for example, the dimensions of the projection image.

The distance sensor 9 is coupled to the projection controlling apparatus 1 to measure the distance L from the distance sensor 9 to the position of projection Pp of the projection image Pi and the distance Lh from the distance sensor 9 to the pointing person H. The distance Lhp between the pointing person H and the projection image Pi is obtainable by L−Lh. For example, in performing projection control according to the present embodiment, the main controller 2MC of the projection controlling apparatus 1 illustrated in FIG. 1 executes tasks to obtain the distance Lhp between the pointing person H and the projection image Pi. Then, the main controller 2MC executes tasks to change the first period (T1) and the second period (T2), so as to change the first period (T1) and the second period (T2) based on the resultant distance Lhp between the pointing person H and the projection image Pi.

In the projection controlling method according to the present embodiment, the first period (T1) and the second period (T2) may be changed by using at least one of the above-described three techniques. Effect of hand jiggling is more accurately estimated by combining two or more of the above-described three techniques. As a result, at Steps S104 and S111, the intention of the pointing person is judged at higher accuracy.

At least one of the above-described three techniques may be used to change the dimensions of the region Ap illustrated in FIGS. 6 and 7. For example, since the effect of hand jiggling becomes noticeable as the dimensions of the projection image Pi at the position of projection decreases, the dimensions of the region Ap may be set larger accordingly. Since the effect of hand jiggling becomes noticeable as the object ratio decreases, the dimensions of the region Ap may be set larger accordingly. Since the effect of hand jiggling becomes noticeable as the distance Lhp between the pointing person H and the position of projection Pp widens, the dimensions of the region Ap may be set larger accordingly. In this manner, the effect of hand jiggling is more reliably eliminated. As has been already described, two or more of the above-described three techniques may be combined.

Figure 14:
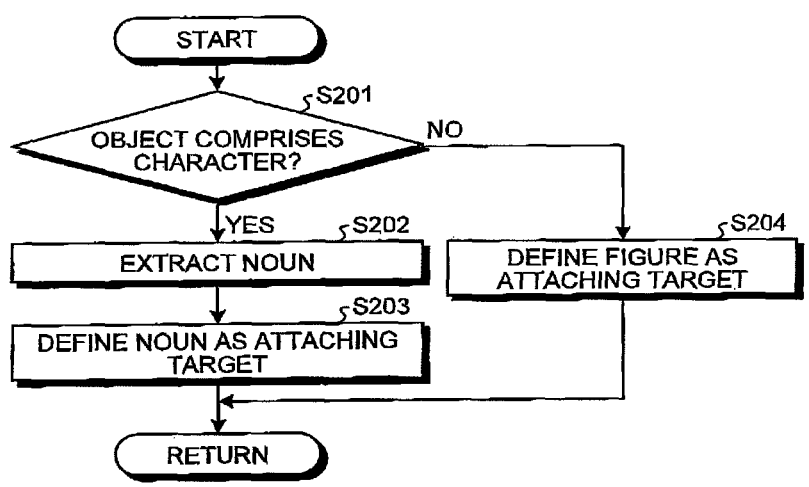
FIG. 14 is a flowchart illustrating the steps of extracting a noun and attaching a pointing index thereto in the case where the attaching target is a character string.
Figure 15:
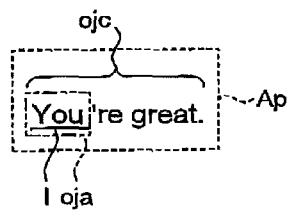
FIG. 15 is an explanatory diagram illustrating the steps of extracting a noun and attaching a pointing index thereto in the case where the attaching target comprises characters.

FIG. 14 is a flowchart illustrating the steps of extracting a noun and attaching a pointing index thereto in the case where the attaching target is a character string. FIG. 15 is an explanatory diagram illustrating the steps of extracting a noun and attaching a pointing index thereto in the case where the attaching target is characters. In the case where the object to be attached with a pointing index I illustrated in FIG. 7 is a character string, it is often the case that nouns are intended to be put emphasis on.

Thus, when an attaching target is decided at Step S105 illustrated in FIG. 5, a noun may be extracted from the character string to be set as the attaching target. Next, this technique is described with reference to FIGS. 14 and 15.

At Step S105 of the projection controlling method according to the present embodiment, in deciding an attaching target, the determiner 2e determines whether or not the object in the region Ap illustrated in FIG. 15 comprises a character at Step S201. For example, the determiner 2e determines whether or not an object is a character according to the attribute information of the object in the region Ap. In the case where the object in the region Ap is a character (Yes at Step S201), the processing proceeds to Step S202, and the information extractor 2c extracts a noun from the object in the region Ap. For example, as illustrated in FIG. 15, in the case where the object in the region Ap is a character string object ojc of "You're great.", the information extractor 2c extracts a noun from this character string object ojc at Step S202.

For extracting a noun from the character string object ojc, for example, morphological analysis is used.

The morphological analysis is one of computer-implemented natural language processing technologies, by which a sentence is broken into words with meanings and the parses and contents thereof are identified by using dictionaries. The morphological analysis is used for, for example, kana-to-kanji conversion and machine translation. A morpheme is a minimum unit of elements with meanings in a sentence.

At step S202, the information extractor 2c performs the morphological analysis on the character string object ojc, so as to extract a noun. In the example illustrated in FIG. 15, "You" is a noun, and thus the information extractor 2c extracts "You" as a noun. The processing proceeds to Step S203, and the determiner 2e defines that the attaching target oja is a noun, more specifically, a noun "You" in the character string object ojc. Then, the processing proceeds to Step S106 illustrated in FIG. 5, and the image editor 2f generates image information (first image information) in which the noun "You" defined as the attaching target oja is attached with a pointing index I. In the case where the object in the region Ap is not a character at Step S201 (No at Step S201), the processing proceeds to Step S204, and the determiner 2e defines that the attaching target is a figure. Subsequently, the processing proceeds to Step S106 illustrated in FIG. 5, and the image editor 2f generates image information (first image information) in which the figure defined as the attaching target is attached with a pointing index.

This technique allows for preferential attachment of a pointing index I to a noun to be put emphasis on in the case where the object to be attached with the pointing index I is a character string, which improves operability. In the present embodiment, in the case where the object to be attached with a pointing index I is a character string, the attaching target is set as a noun; however, a phrase containing a noun and a postposition may be defined as the attaching target. For example, in the example of FIG. 15, the attaching target may be the noun "You" and the immediate postposition "'re" as one phrase. In this case, a pointing index I is attached to the phrase "You're". The phrase may also include a punctuation mark.

Figure 16A:
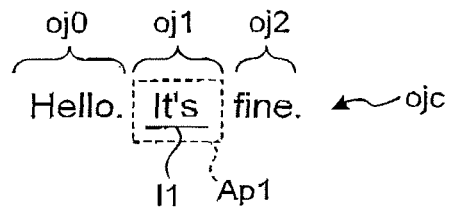
FIG. 16A is a diagram illustrating a technique of attaching a pointing index to an object adjacent to an object attached with a pointing index.

FIGS. 16A to 16D are diagrams illustrating a technique of attaching a pointing index to an object that is adjacent to an object having a pointing index attached thereto. For example, consider a case in which a character string object ojc illustrated in FIG. 16A is projected by the projector 5 illustrated in FIG. 1. The character string object ojc is dividable into three pieces of objects oj0, oj1, and oj2, and a region Ap1 is created with respect to the object oj1 with a pointing index I1 attached to the object. Specifically, the projection unit 2a of the projection controlling apparatus 1 illustrated in FIG. 1 causes the projector 5 to project the object ojc1 with the pointing index I1 affixed thereto and the objects ojc0 and ojc2 with no pointing index affixed thereto.

Figure 16B:
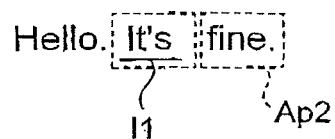
FIG. 16B is a diagram illustrating a technique of attaching a pointing index to an object adjacent to an object attached with a pointing index.

The object oj1 added with the pointing index I1 is defined as a first object, and the object(s) adjacent to the first object is (are) defined as a second object. In this case, examples of the second object include the objects oj2 and oj0. The region generator 2d generates here, as illustrated in FIG. 16B, a second region Ap2 in association with the object oj2.

Figure 16C:
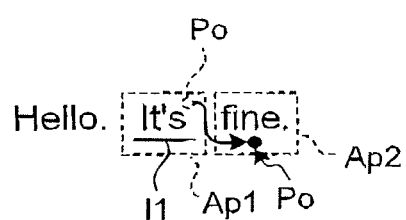
FIG. 16C is a diagram illustrating a technique of attaching a pointing index to an object adjacent to an object attached with a pointing index.
Figure 16D:
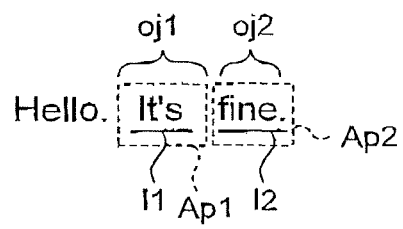
FIG. 16D is a diagram illustrating a technique of attaching a pointing index to an object adjacent to an object attached with a pointing index.

In this state, as illustrated in FIG. 16C, consider a case in which the information extractor 2c detects movement of the point Po from the region Ap1 associated with the object oj1 to the region Ap2 associated with the object oj2. In this case, the image editor 2f generates as first image information an image in which a pointing index I2 is added to the object oj2, and the projection unit 2a causes the projector 5 to project an image based on the first image information. In this manner, as illustrated in FIG. 16D, the object oj2 with the pointing index I2 attached thereto is projected by the projector 5 together with the object oj1 attached with the pointing index I1.

It is highly probable that a pointing index is attached next to the object oj2 that is adjacent to the object oj1 attached with the pointing index I1. According to the above-described technique, the region Ap2 is produced in advance in the vicinity of the object oj2 with high probability of being attached with a pointing index, such that, being triggered by the movement of the point Po to the region Ap2, the pointing index I2 is attached to the object oj2 in the region Ap2. Thus, according to the above-described technique, preparation for attaching the pointing index I2 is made in advance with respect to the object oj2 with high probability of being attached with a pointing index. As a result, the pointing index I2 is swiftly attached to the object oj2, which improves operability and usability. Since a pointing index is attached to an object to which the pointing person may probably want to attach a pointing index next, a situation is avoided easier in which a pointing index is given to an object which is not intended by the pointing person.

The object that is adjacent to the object oj1 with the pointing index I1 attached thereto includes two objects, i.e., the objects oj0 and oj2. Of these objects, a region may be created with respect to the object that is adjacent in a specific direction to the object oj1 attached with the pointing index I1. The specific direction may be a direction in which the character string is written, and usually, from the right to the left, which holds true to the above technique. Thus, the region Apt is created in association with an object (the object oj2 in the above example) that holds an adjacent position in the direction that the character string is written, such that reliable attachment of a pointing index is achieved with respect to an object to which a pointing index is intended to be given next.

The pointing index I2 to be attached to the object oj2 may be similar to the pointing index I1 attached to the object oj1. In this manner, unpleasant feeling is relieved, which may otherwise be caused by different pointing indices being attached to the objects oj1 and oj2 adjacent to each other, and sense of integrity is given to the pointing indices to be attached to both the objects, which gives aesthetic feeling of the image projected. It should be noted that a case of attaching different pointing indices to objects oj1 and oj2 adjacent each other is not excluded. Description is given next of a technique of deleting a pointing index.

Figure 17:
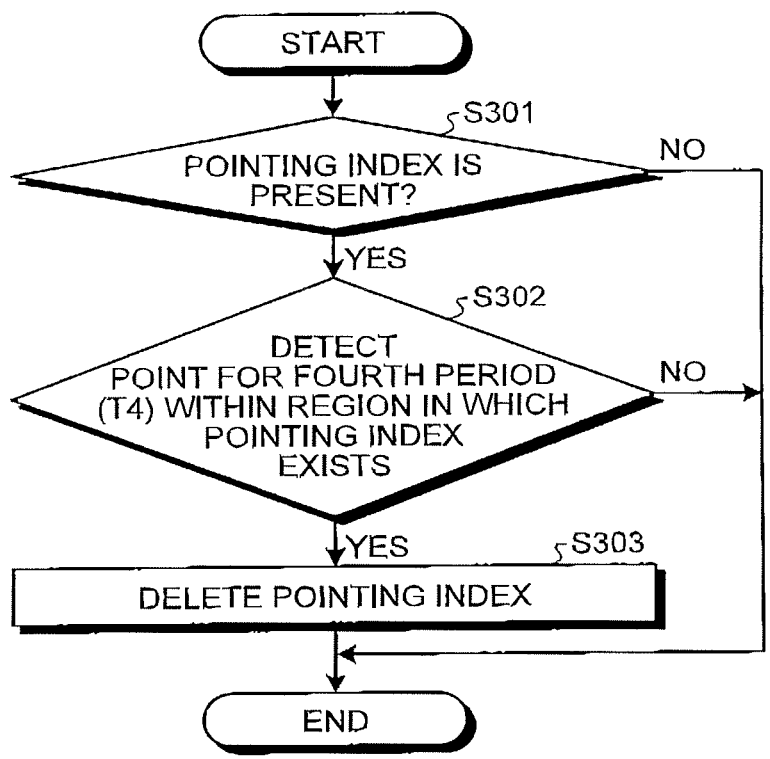
FIG. 17 is a flowchart of a first technique of deleting a pointing index.
Figure 18:
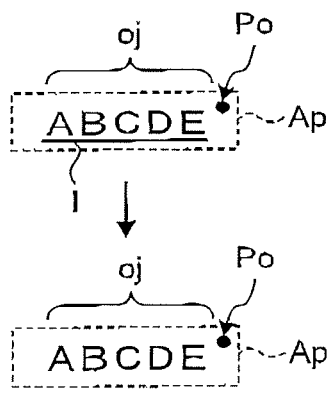
FIG. 18 is a diagram for explaining the technique of deleting a pointing index.

FIG. 17 is a flowchart of a first technique of deleting a pointing index. FIG. 18 is a diagram for explaining the technique of deleting a pointing index. In the present embodiment, the pointing index attached to an object is deleted by a predetermined operation. To perform the first technique of deleting a pointing index, the determiner 2e of the projection controlling apparatus 1 illustrated in FIG. 1 determines whether or not a pointing index is present in the projection image currently being projected by the projector 5, based on the first image information stored in the projection image storage portion 3b at Step S301.

In the case where the determiner 2e determines that a pointing index is not present (No at Step S301), the first technique is terminated. In the case where the determiner 2e determines that a pointing index is present (Yes at Step S301), the processing proceeds to Step S302. As illustrated in FIG. 18, the determiner 2e determines whether or not the information extractor 2c has detected the point Po within the region Ap in which the pointing index I exists for a predefined certain fourth period (T4) at Step S302. T4 may be set, for example, longer than T3. In the case where the determiner 2e determines that the point Po has not been detected for the fourth period (T4) (No at Step S302), the first technique is terminated.

In the case where the determiner 2e determines that the point Po has been detected for the fourth period (T4) (Yes at Step S302), the processing proceeds to Step S303. As illustrated in the lower portion of FIG. 18, the image editor 2f generates an image in which the pointing index I attached to the object of is deleted and causes the projection image storage portion 3b to store the image as first image information at Step S303. The projection unit 2a causes the projector 5 to project the first image information stored in the projection image storage portion 3b. Then, as illustrated in FIG. 18, projected is an image in which the pointing index I affixed to the object of in the region Ap is deleted.

According to the first technique, in the case where the point Po of the pointer 8 is continuously detected for the fourth period (T4) within the region Ap in which the pointing index I exists, determination is made that the pointing person has an intention to delete the pointing index I, and the pointing index I is deleted. As is described, since the pointing index I is deletable by a simple operation according to the first technique, operability and user-friendliness are improved.

Figure 19:
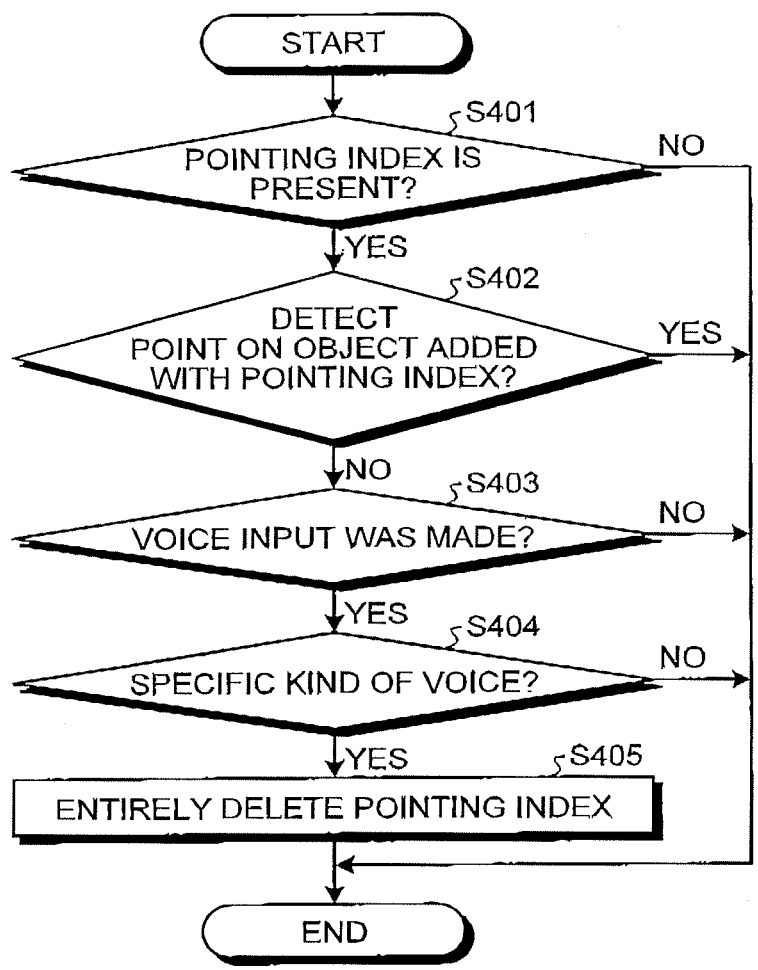
FIG. 19 is a flowchart of a second technique of deleting a pointing index.

FIG. 19 is a flowchart of a second technique of deleting a pointing index. According to the second technique, pointing indices are deleted according to certain voice of the pointing person. In performing the second technique, the determiner 2e determines whether or not a pointing index is present in the projection image currently being projected by the projector 5, based on the first image information stored in the projection image storage portion 3b at Step S401.

In the case where the determiner 2e determines that a pointing index is not present (No at Step S401), the second technique is terminated. In the case where the determiner 2e determines that a pointing index is present (Yes at Step S401), the processing proceeds to Step S402. As illustrated in FIG. 18, the determiner 2e determines whether or not the information extractor 2c has detected a point Po within the region Ap in which the pointing index I exists at Step S402. In the case where the determiner 2e determines that the point Po is detected (Yes at Step S402), the second technique is terminated.

In the case where the determiner 2e determines that a point Po is not detected (No at Step S402), the processing proceeds to Step S403. At Step S403, the determiner 2e determines whether or not a voice input has been made, namely, the voice detector 2g illustrated in FIG. 1 has detected voice obtained by the microphone 7. In the case where the determiner 2e determines no voice input (No at Step S403), the second technique is terminated. In the case where the determiner 2e determines that voice input has been made (Yes at Step S403), the processing proceeds to Step S404.

At Step S404, the determiner 2e determines whether or not the voice is a specific kind of voice, namely, the voice detected by the voice detector 2g illustrated in FIG. 1 is a specific kind of voice. The specific kind of voice is, for example, speech of the pointing person for commanding deletion of a pointing index, such as "delete" or "erase". In the case where the determiner 2e determines that the voice is not the specific kind of voice (No at Step S404), the second technique is terminated. In the case where the determiner 2e determines that the voice is the specific kind of voice (Yes at Step S404), it is determinable that the pointing person has an intention to delete the pointing index, and the processing thus proceeds to Step S405.

As illustrated in the lower portion of FIG. 18, the image editor 2f generates an image in which the pointing index I attached to the object oj is deleted and causes the image to be stored in the projection image storage portion 3b as first image information at Step S405. In the case where a plurality of objects oj having the pointing index I attached thereto exists, the image editor 2f generates an image in which the pointing indices I attached to the objects oj are entirely deleted and causes the image to be stored in the projection image storage portion 3b as first image information. The projection unit 2a causes the projector 5 to project the first image information stored in the projection image storage portion 3b. Then, as illustrated in FIG. 18, projected is an image in which the pointing index I attached to the object oj in the region Ap is deleted. In the case where a plurality of objects oj having the pointing index I attached thereto exists, projected is an image in which the pointing indices I are entirely deleted.

According to the second technique, the pointing index I is deleted based on a specific kind of voice of the pointing person. Thus, the pointing index I is deletable by a simple operation, which provides for improved operability and user-friendliness. Moreover, according to the second technique, the pointing index I is deletable with a voice even when the pointing person is using both hands, thus allowing for further improved user-friendliness.

Figure 20:
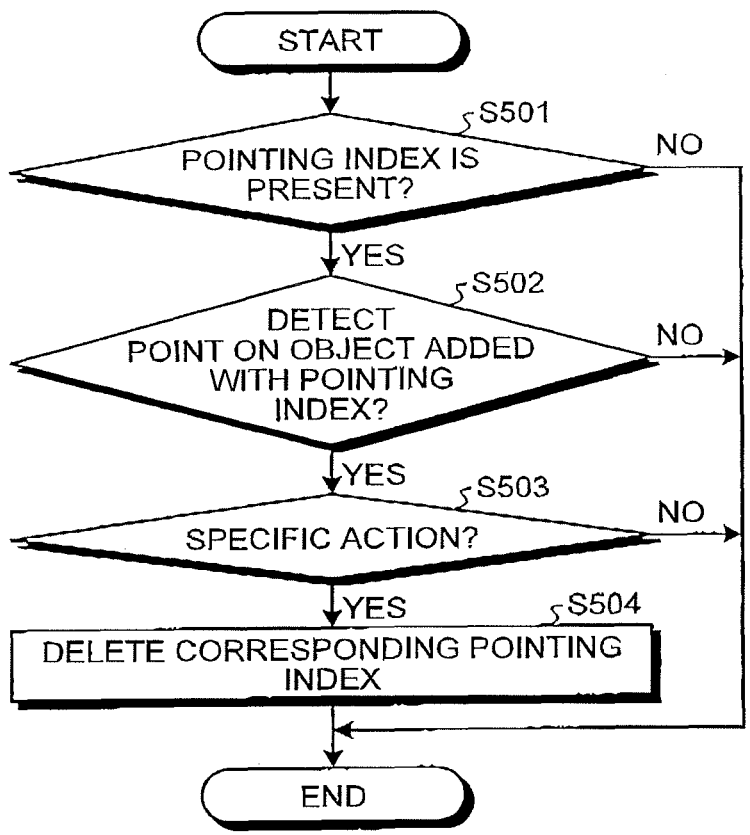
FIG. 20 is a flowchart of a third technique of deleting a pointing index.
Figure 21:
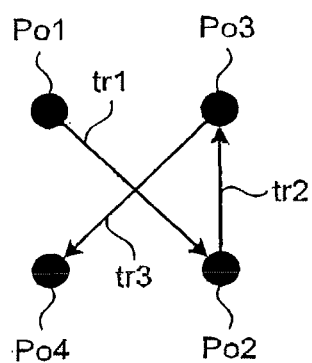
FIG. 21 is an explanatory diagram of the third technique of deleting a pointing index.

FIG. 20 is a flowchart of a third technique of deleting a pointing index. FIG. 21 is an explanatory diagram of the third technique of deleting a pointing index. According to the third technique, in the case where a specific action of a point is detected on an object with a pointing index attached thereto in the projection image being projected, the pointing index is deleted. In performing the third technique, since Steps S501 and S502 are the same as Steps S401 and S402 of the second technique (see FIG. 19), description is not given.

In the case where the determiner 2e determines that the point Po is not detected at Step S502 (No at Step S502), the third technique is terminated. In the case where the determiner 2e determines that the point Po is detected at Step S502 (Yes at Step S502), the processing proceeds to Step S503.

At Step S503, the determiner 2e determines whether or not the information extractor 2c has extracted a specific action of the point Po. The specific action of the point Po is, for example, an action of drawing a cross on the object of added with the pointing index I. As illustrated in FIG. 21, this action is such that the point is moved in the order of Po1, Po2, Po3, and Po4, and the tracks thereof make tr1, tr2, and tr3. Then, the tracks tr1 and tr3 intersects with each other. In the case where the determiner 2e determines that the information extractor 2c has not extracted such an action of the point Po (No at Step S503), the third technique is terminated.

In the case where the determiner 2e determines that the information extractor 2c has extracted the specific action of the point Po (Yes at Step S503), it is determinable that the pointing person has an intention to delete the pointing index, and the processing thus proceeds to Step S504. At Step S504, the image editor 2f generates an image in which the targeted pointing index I is deleted in response to the specific action of the point Po on the object, and causes the image to be stored in the projection image storage portion 3b as first image information. The projection unit 2a causes the projector 5 to project the first image information stored in the projection image storage portion 3b. Then, projected is an image in which the pointing index I affixed to the object in the region is deleted. According to the third technique, pointing index is deleted based on a specific action of the point made by the pointing person. Thus, pointing index is deletable by a simple operation, and operability and user-friendliness are thus improved.

Figure 22:
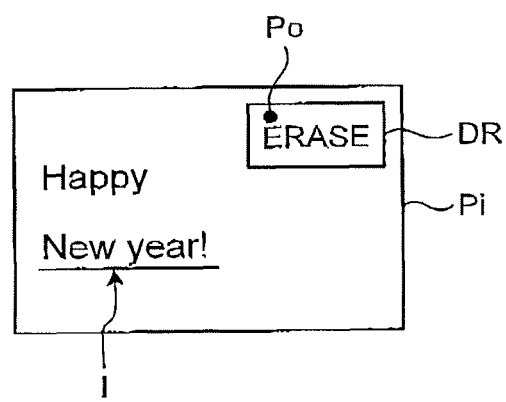
FIG. 22 is an explanatory diagram of a fourth technique of deleting a pointing index.

FIG. 22 is an explanatory diagram of a fourth technique of deleting a pointing index. According to the fourth technique, as illustrated in FIG. 22, the projection image Pi of the projector 5 illustrated in FIG. 1 is projected with a region to be designated for deletion of the pointing index (deletion instructed region) DR contained therein. Then, when the information extractor 2c extracts a point Po existing on the deletion instructed region DR for a certain period, the image editor 2f generates an image in which a pointing index I is deleted from the object to which the pointing index I having been attached, and causes the image to be stored in the projection image storage portion 3b as first image information. The projection unit 2a causes the projector 5 to project the first image information stored in the projection image storage portion 3b. Then, projected is an image in which the pointing index I affixed to the object is deleted. In the fourth technique, the operation for deleting the pointing index I is simply to designate the deletion instructed region DR with the point Po. Thus, the operation for deleting a pointing index is easily understandable, and also pointing indices are deletable by a simple operation, allowing for further improvement in operability and user-friendliness.

The invention claimed is:

1. A projection controlling apparatus for causing a projector to project an image, comprising:
   a detector for detecting a point directed to a first image projected by the projector;
   an extractor for extracting a first object contained in the first image based on the point; and
   a projection unit for causing the projector to project a second image that is an image with a pointing index added to the first object in the first image,
   wherein the projection unit is configured to add, in case where the first object comprises at least one of a character and a numeric, character, the pointing index to the first object by changing a font of the character and/or the numeric character.

2. The projection controlling apparatus according to claim 1, further comprising a region generator for generating a first region containing the first object, wherein
   the projection unit is configured to cause the projector to project the second image, in case where the point is detected within the first region continuously for a first period.

3. The projection controlling apparatus according to claim 2, wherein
   the region generator is configured to erase the first region, in case where the point is not detected within the first region continuously for a second period between generating the first region and adding the pointing index to the first object.

4. The projection controlling apparatus according to claim 3, wherein
   the projection unit is configured to decide at least one of the first period and the second period based on at least one of a dimension of the first image at a position of projection thereof, a proportion of the first object in the first image, and a distance between an operator of a pointer used for directing the point to the first image and the position of the projection of the first image.

5. The projection controlling apparatus according to claim 2, wherein
   the region generator is configured to decide a dimension of the first region based on at least one of a dimension of the first image at a position of projection thereof, a proportion of the first object in the first image, and a distance between an operator of the pointer and the position of the projection of the first image.

6. The projection controlling apparatus according to claim 2, wherein
   the region generator is configured to generate a second region containing a second object adjacent to the first object with the pointing index added thereto, and
   the projection unit is configured to cause the projector to project an image that is an image with a further pointing index added to the second object in the second image, in case where the point is detected in the second region.

7. The projection controlling apparatus according to claim 6, wherein
   the projection unit is configured to add the pointing indices similar to each other to the first object and the second object.

8. The projection controlling apparatus according to claim 6, wherein
   the region generator is configured to generate the second region containing the second object adjacent to the first object in a specific direction.

9. The projection controlling apparatus according to claim 2, wherein
   the projection unit is configured to cause the projector to project an image with another pointing index added to the first object in the second image, in case where the point is detected within the first region continuously for a third period while the pointing index is added to the first object.

10. The projection controlling apparatus according to claim 2, wherein
    the projection unit is configured to cause the projector to project an image with the pointing index deleted from the first object in the second image, in case where the point is detected within the first region continuously for a fourth period while the pointing index is added to the first object.

11. The projection controlling apparatus according to claim 1, further comprising a microphone for inputting voice, wherein
    the projection unit is configured to cause the projector to project an image with the pointing index deleted from the first object in the second image, in case where a specific kind of voice is input by the microphone while the pointing index is added to the first object.

12. The projection controlling apparatus according to claim 11, wherein
    the projection unit is configured to cause, in case where the specific kind of the voice is input by the microphone while an image with a plurality of pointing indices added thereto is projected, the projector to project an image with the pointing indices entirely deleted therefrom.

13. The projection controlling apparatus according to claim 1, wherein
    the detector is configured to detect the point by comparing first image information based on which the first image is projected with second image information obtained by capturing the first image projected by the projector.

14. The projection controlling apparatus according to claim 13, further comprising:
    an output unit for outputting the first image information to the projector; and
    an input unit for inputting the second image information from an imaging device.

15. The projection controlling apparatus according to claim 13, further comprising an imaging unit for capturing an image projected by the projector, wherein
the detector is configured to obtain the second image information from the imaging unit.

16. The projection controlling apparatus according to claim 13, further comprising a communicator for obtaining the first image information through a communication line, wherein
the projection unit is configured to cause the projector to project the first image based on the first image information obtained by the communicator.

17. A projection controlling method, comprising:
causing a projector to project a first image;
detecting a point directed to the first image projected by the projector;
extracting a first object contained in the first image based on the point;
causing the projector to project a second image that is an image with a pointing index added to the first object in the first image; and
causing the projector to project an image with thepointing index deleted from the first object the second image in case where a specific kind of voice is input by a microphone while the pointing index is added to the first object.

18. The projection controlling method according to claim 17, further comprising generating a first region containing the first object, wherein
the causing the projector to project the second image includes causing the projector to project the second image in case where the point is detected within the first region continuously for a first period.

19. The projection controlling method according to claim 18, wherein
the detecting includes detecting the point by comparing first image information based on which the first image is projected with second image information obtained by capturing the first image projected by the projector.

20. A projection controlling apparatus for causing a projector to project an image, comprising:
a detector for detecting a point directed to a first image projected by the projector;
an extractor for extracting a first object contained in the first image based on the point; and
a projection unit for causing the projector to project a second image that is an image with a pointing index added to the first object in the first image,
wherein the projection unit is configured to cause the projector to project an image with another pointing index added to the first object in the second image, in case where the point is detected within a first region containing the first object continuously for a predetermined period while the pointing index is added to the first object.

21. A projection controlling apparatus for causing a projector to project an image, comprising:
a detector for detecting a point directed to a first image projected by the projector;
an extractor for extracting a first object contained in the first image based on the point; and
a projection unit for causing the projector to project a second image that is an image with a pointing index added to the first object in the first image,
wherein the projection unit is configured to delete the pointing index, in case where the point is detected outside a first region containing the first object continuously for a predetermined period.

* * * * *